United States Patent [19]
Gotshall

[11] 3,820,724
[45] June 28, 1974

[54] USING GROUND CARBON IN OIL PHASE MASTERBATCHING

[75] Inventor: William W. Gotshall, Orchard Lake, Mich.

[73] Assignee: Marathon Oil Company, Findley, Ohio

[22] Filed: Dec. 23, 1971

[21] Appl. No.: 211,672

Related U.S. Application Data

[62] Division of Ser. No. 22,646, March 25, 1970, Pat. No. 3,640,940.

[52] U.S. Cl.................. 241/39, 241/79, 241/101.5
[51] Int. Cl............................................. B02c 21/00
[58] Field of Search........ 241/38, 39, 41, 79, 101.5, 241/101.6; 106/307

[56] References Cited
UNITED STATES PATENTS
| | | | |
|---|---|---|---|
| 1,058,313 | 4/1913 | Luckenbach | 241/39 |
| 2,914,391 | 11/1959 | Stratford | 241/39 X |
| 3,404,019 | 10/1968 | Gotshall | 106/307 |

*Primary Examiner*—Granville Y. Custer, Jr.
*Attorney, Agent, or Firm*—Joseph C. Herring; Richard C. Willson, Jr.; Jack L. Hummel

[57] ABSTRACT

Ground carbons from coke or coal ground in nonoxidizing atmosphere and coated with oil can be dispersed and protected from oxidation by mixing them directly into oil phase masterbatches.

2 Claims, 1 Drawing Figure

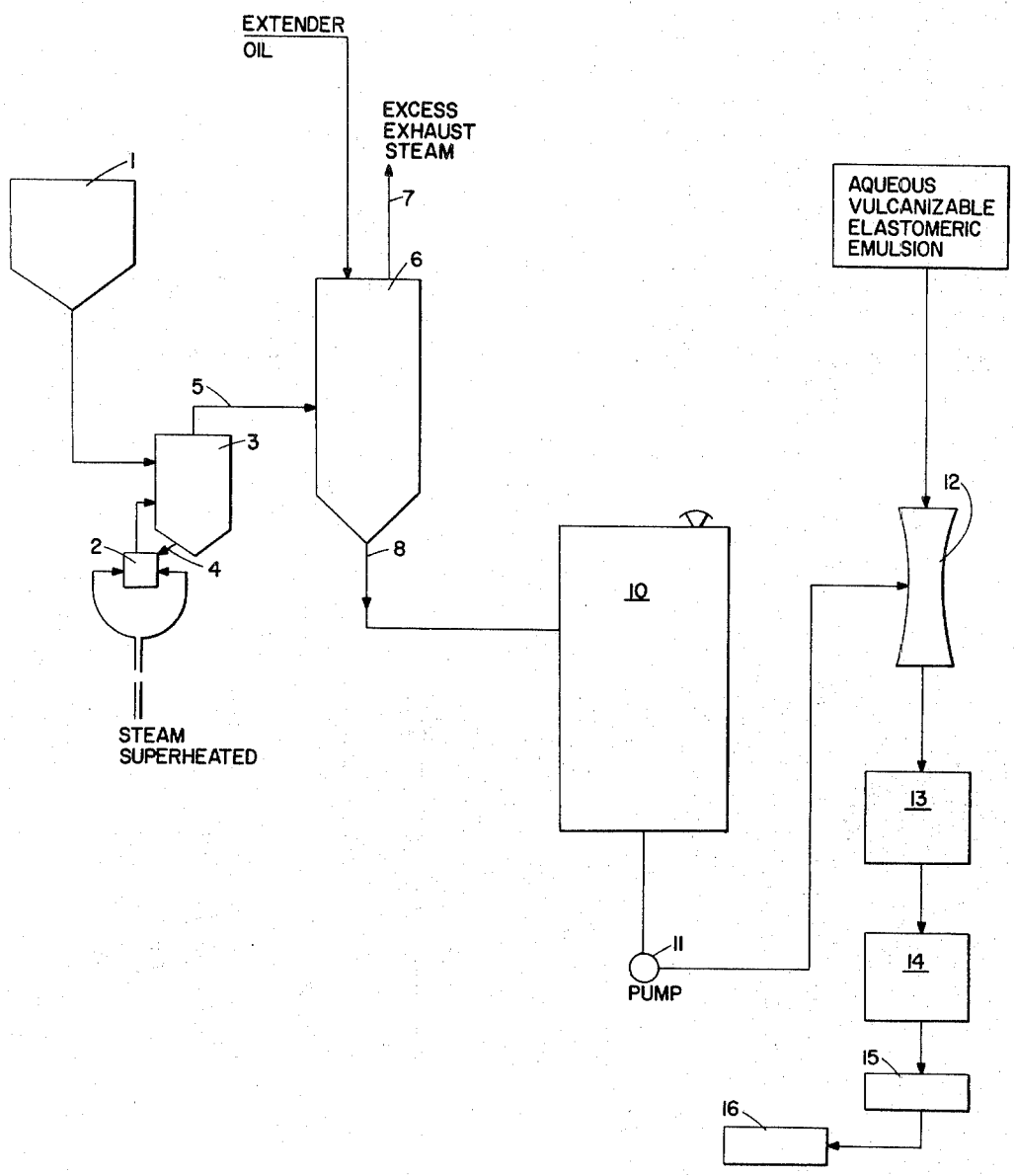

USING GROUND CARBON IN OIL PHASE MASTERBATCHING

CROSS REFERENCES TO RELATED APPLICATIONS

This is a division, of U.S. Pat. application Ser. No. 22,646, filed Mar. 25, 1970, now U.S. Pat. No. 3,640,940, issued Feb. 8, 1972.

The following U.S. Pat. application relates to the general field of the invention: U.S. Pat. application Ser. No. 22,644 filed Mar. 25, 1970, pending in U.S. Pat. Office.

BACKGROUND OF THE INVENTION

DESCRIPTION OF THE PRIOR ART

The production of superior reinforcing agents by grinding cokes, chars, coals, and other carbonaceous materials in a nonoxidizing atmosphere, particularly in a fluid energy mill are disclosed in the aforementioned related U.S. Pat. applications as well as in U.S. Pat. No. 3,404,019 and 3,404,120 and divisional applications thereof, all to the inventor of the present application. Techniques for the production of masterbatches comprising conventional carbon blacks, vulcanizable elastomers, and other components of vulcanizable elastomeric compositions are taught in Chapter 11 in "Reinforcement of Elastomers" by Gerard Kraus and "Introduction to Rubber Technology" by Maurice Morton, Chapter 8, page 201.

The techniques of the above-mentioned U.S. patents require that carbonaceous material be ground in a nonoxidizing atmosphere and then be protected from oxygenation of the surface until it is compounded into a vulcanizable elastomeric composition. Preferably, this protection is accomplished by coating the individual particles with solid or liquid barriers against oxygenation. Normally, this process requires a grinding mill, a classifier, a dust collector, a mixer in which the particles are coated under an inert atmosphere, a pelletizer to render the carbon particles more convenient to handle, in some cases a bagging apparatus, and a second mixer in which the vulcanizable elastomeric composition is compounded. All of this apparatus requires substantial capital investment, particularly since the apparatus (excluding the pelletizer and second mixer) must generally operate under a nonoxidizing atmosphere. Further, the freight rate for transportation of finished carbon blacks is substantially higher than that for the carbonaceous materials from which they are made according to the aforementioned U.S. patents.

GENERAL STATEMENT OF THE INVENTION

The present invention, by intercombining certain steps of the masterbatching and carbon pulverizing processes, provides a masterbatch composition to which only accelerators and sulfur need be added prior to vulcanizing. At the same time, the invention minimizes the chances for deleterious oxygenation of the carbon surfaces and reduces the number of components and the capital investment required. Further, the present invention permits shipping the carbonaceous raw materials to a relatively inexpensive combination carbon-pulverizing and masterbatching facility which can be located at the masterbatching plant to avoid more expensive shipment of the finished carbon reinforcement agents.

In the practice of the invention, selected coke or coal is ground under a nonoxidizing atmosphere in a fluid energy mill and particles in the desired size range are substantially continuously contacted with conventional extending oils to form a slurry which is mixed with a water emulsion of vulcanizable elastomer and surfactant to form a masterbatch. After coagulation and dewatering, the masterbatch is ready for addition of sulfur, accelerators and other desired modifying ingredients and fabrication into finished rubber products. The required apparatus omits the dust collector and coating mixer and their related inert atmosphere accessories and instead connects an oil scrubber to the outlet of the classifier to form the slurry substantially continuously and avoid significant oxygenation of the carbon surfaces.

UTILITY OF THE INVENTION

The masterbatches prepared by the processes and apparatus of the present invention are useful in the manufacture of a wide variety of elastomeric products including mechanical rubber goods, tire carcasses and tread stocks, rubber extrusions, and similar materials made from vulcanizable elastomers such as natural and synthetic rubber, styrene-butadiene copolymer, butadiene-acrilonitrile copolymer, butyl rubber, ethylene-propylene-diolefin terpolymer, polyisoprene, vulcanizable polymeric elastomeric material containing double bonds and derived from chloroprenes or fluoroprenes.

BRIEF DESCRIPTION OF THE DRAWING

The drawing is a schematic representation of the apparatus of the present invention.

DESCRIPTION OF THE PREFERRED EMBODIMENTS

STARTING MATERIALS

Carbon materials

Carbonaceous materials suitable as starting materials for the present invention include delayed petroleum coke, fluid petroleum coke, anthracite coal, coke derived from coal, char, e.g. nonagglomerating materials derived from coal or by the techniques of copending application Ser. No. 22,648 filed Mar. 25, 1970 now U.S. Pat. No. 3,644,131. Preferably the carbonaceous materials should contain from about 0.1 to about 10, more preferably from 1 to about 8, and most preferably from 2 to about 6 percent by weight volatile combustible matter based on the weight of carbon. Preferably from about 25 to about 400, more preferably from about 40 to about 200, and most preferably from about 50 to about 100 parts by weight of carbon will be employed for each part by weight of elastomer in the finished masterbatch (phr).

Vulcanizable Elastomers

Vulcanizable elastomers in general may be employed, but preferred among these will be those mentioned above under "Utility," and most preferred are styrene-butadiene copolymer (SBR), and butyl rubber.

Surfactants

Conventional surfactants, e.g. sodium lignin sulfonate or rosin acid soap which are utilized for the preparation of aqueous emulsions or vulcanizable elastomers in conventional masterbatching will be employed. About 0.25 to about 10, more preferably from about 0.5 to about 5, and most preferably from about 1 to about 3 parts of surfactant per hundred parts by weight of carbon will be employed.

Extender Oils

Conventional extender oils, e.g. "naphthenic," "aromatic," or "highly aromatic" oils may be utilized with the present invention in the amounts normally used when employing conventional carbon blacks in the formulations. Extending oil loadings of from 10 to about 75, more preferably 15 to 50, and most preferably 20 to 40 parts per hundred parts of elastomer (phr), can be utilized with the present invention. In general, the extender oils will be of the conventional types discussed in the aforementioned text by Morton and the references cited therein, particularly in Chapter 7.

APPARATUS

The preferred grinding mills for pulverizing the carbonaceous material are fluid energy mills of the type commonly referred to as "hurricane mills," e.g. the Model No. 30–10 mill manufactured by Majac, Inc. of Sharpsburg, Pa. The fluid energy mills can operate on a wide variety of inert, nonoxidizing atmosphere. By "nonoxidizing atmosphere" is meant herein, media which do not contain substantial quantities of free oxygen. Steam is the most preferred grinding media from the standpoint of economy, but nitrogen, helium, hydrogen, argon, and a wide variety of other gases commonly thought of as inert or reducing, may be utilized. For maximum economy in grinding, gases of lower molecular weights, e.g. hydrogen and steam, are preferred.

The autogenous grinding mill is conventionally operated, preferably at temperatures of from about 350° to about 800° F, more preferably from about 400° to about 700° F, and most preferably at 400°–500° F. The classifier is operated to provide an average particle size (by weight) of less than about 2.5 microns with 99 percent by weight of the product having particle size of less than 5 microns. More preferred ranges are average particle size of less than 1.5 and 99 percent by weight less than 3 microns.

The classifier is preferably a centrifugal type and is operated under nonoxidizing atmosphere. The scrubber can be of conventional design to provide intimate contact between the oil and the ground carbon exiting from the classifier. Similarly, the emulsion-slurry mixer can be of conventional design, preferably a venturi mixer to provide intimate contact between the carbon-containing oil slurry and the elastomeric emulsion. Conventional filters, surge tanks, and settling tanks may be employed.

EXAMPLE

The invention will be more fully understood by reference to the following example which is to be included as merely illustrative thereof.

EXAMPLE I

Referring to the drawing, a raw fluid coke produced by granulating a fluid petroleum coke of the type produced according the methods of A. Voorhies, Fluid Coking, Proceedings of the Fourth World Petroleum Congress, Section III/F, page 360 and Petroleum Processing, March, 1956, pages 135 to 137 is fed from bin 1 to a Model No. 30–10 mill, 2, manufactured by Majac, Inc. of Sharpsburg, Pa. Steam is utilized as the grinding fluid and a sonic velocity at approximately 400° to 800° F. (after exiting from the nozzle) and 100 to 150 p.s.i.g. nozzle pressure is maintained in the grinding section of the mill. This particular mill has opposed nozzles which cause a stream of particles to impinge upon a second stream of particles causing highly efficient autogenous grinding. This grinding process is continued with particles having an average particle size of below about 1.5 microns and 99 percent by weight having a particle size below about 3 microns being continuously withdrawn from the classifier 3 of the Majac Mill 2. Oversize particles are returned to the pulverizer for further grinding through conduit 4. Steam and ground carbon of the desired maximum particle size are propelled by steam pressure through conduit 5 to venturi scrubber 6 where the excess steam is exhausted through outlet 7 and the carbon particles are contacted with extender oil. Approximately 2 No. of oil are fed to the venturi scrubber for each pound of ground carbon entering the scrubber and the oil-carbon mixture exits through outlet 8 of the scrubber as a 33 percent carbon oil slurry. The slurry is stirred in an agitated surge tank 10. A pump 11 conveys the slurry into venturi mixer 12 where it is intimately mixed with an aqueous vulcanizable elastomeric emulsion consisting of 92–97 percent water, 2 percent sodium lignin sulfonate surfactant, and 5–10 percent SBR. Approximately 0.75 pounds of carbon in an oil slurry are fed for each pound of vulcanizable elastomer in an aqueous emulsion. The mixture exiting from the venturi mixer is then acidified in vessel 13 to a pH in the range of 6.5 to 7.5 in order to coagulate the masterbatch from the excess water which is separated out by settling in tank 14 and filtering in filter 15. Masterbatch is then conventionally baled in baler 16 and stored until it is to be mixed with sulfur, accelerators and other ingredients and vulcanized into finished vulcanized elastomeric products.

Modifications of the Invention

It should be understood that the invention is capable of a variety of modifications and variations which will be made apparent to those skilled in the art by a reading of the specification and which are to be included within the spirit of the claims appended hereto. See, for example, the techniques of Chapter 11, "Reinforcement of Elastomers" edited by Gerard Kraus, Interscience Publishers Div. of John Wiley & Sons, and references cited therein.

What is claimed is:

1. Apparatus for the production of masterbatches comprising vulcanizable elastomers and carbon particles having surfaces substantially free from oxygenation, said apparatus comprising in combination:
    a. a fluid energy mill communicating with a source of non-oxidizing gas, said fluid energy mill having an outlet for ground particles,
    b. a particle size classifier communicating with said outlet for ground particles, said classifier having a first outlet for particles having a desired maximum size, said desired maximum size being in the range of less than about 2.5 microns and a second particle outlet for particles having sizes above said maximum desired particle size, c. conduit means connecting said second particle outlet of said classifier to said fluid energy mill to cause recycle of particles above said maximum desired particle size,
d. liquid scrubber means communicating with said first outlet of said classifier and having an inlet for liquids and means for contacting said liquids with carbon particles which have exited from said classifier, and having slurry outlet means for exiting a slurry of mixed liquid and carbon particles,
e. mixing means for mixing said slurry with an aqueous emulsion of vulcanizable elastomer, said mixing means communicating with said liquid scrubber,
f. Means for removing excess water from a mixture comprising water, carbon particles, and vulcanizable elastomer formed in said mixing means, said excess water removal means communicating with said mixing means.

2. The apparatus of claim 1 in which the liquid scrubber is a venturi scrubber.

* * * * *